US011337266B2

(12) United States Patent
Zhang et al.

(10) Patent No.: US 11,337,266 B2
(45) Date of Patent: May 17, 2022

(54) MULTI-TRANSMISSION AND RECEPTION POINT (TRP) LINK FAILURE PROCEDURES

(71) Applicant: QUALCOMM Incorporated, San Diego, CA (US)

(72) Inventors: Xiaoxia Zhang, San Diego, CA (US); Tao Luo, San Diego, CA (US); Linhai He, San Diego, CA (US); Ozcan Ozturk, San Diego, CA (US); Arumugam Chendamarai Kannan, San Diego, CA (US); Sungwoo Park, San Diego, CA (US); Mostafa Khoshnevisan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/885,070

(22) Filed: May 27, 2020

(65) Prior Publication Data

US 2021/0058997 A1 Feb. 25, 2021

Related U.S. Application Data

(60) Provisional application No. 62/891,016, filed on Aug. 23, 2019.

(51) Int. Cl.
*H04W 76/18* (2018.01)
*H04B 7/0456* (2017.01)
(Continued)

(52) U.S. Cl.
CPC .......... *H04W 76/18* (2018.02); *H04B 7/0486* (2013.01); *H04B 7/0626* (2013.01);
(Continued)

(58) Field of Classification Search
CPC . H04W 76/18; H04W 24/08; H04W 72/0493; H04W 76/27; H04W 76/19;
(Continued)

(56) References Cited

U.S. PATENT DOCUMENTS

| 2018/0338253 A1 | 11/2018 | Nagaraja et al. |
| 2019/0089447 A1* | 3/2019 | Sang ............... H04W 36/00837 |

(Continued)

FOREIGN PATENT DOCUMENTS

WO   2018237400 A1   12/2018

OTHER PUBLICATIONS

"3rd Generation Partnership Project; Technical Specification Group Radio Access Network; Evolved Universal Terrestrial Radio Access (E-UTRA) and NR; Multi-Connectivity; Stage 2 (Release 15)", 3GPP Standard; Technical Specification; 3GPP TS 37.340, 3rd Generation Partnership Project (3GPP), Mobile Competence Centre; 650, Route Des Lucioles; F-06921 Sophia-Antipolis Cedex; France, vol. RAN WG2, No. V15.6.0, Jun. 28, 2019 (Jun. 28, 2019), pp. 1-69, XP051754444, [retrieved on Jun. 28, 2019].

(Continued)

*Primary Examiner* — Harry H Kim
(74) *Attorney, Agent, or Firm* — Patterson & Sheridan, L.L.P.

(57) ABSTRACT

Certain aspects of the present disclosure provide techniques for performing radio link monitoring (RLM) and radio link failure procedures in multiple-TRP (mTRP) communications, wherein the first TRP is part of a first cell group comprising the first TRP and one or more additional TRPs. The techniques include a method of wireless communication by a user equipment (UE), comprising establishing a plurality of radio links between the UE and a first transmission reception point (TRP) and a second TRP, determining an RLM resource of a first radio link of the plurality of radio (Continued)

links, monitoring the first radio link according to the determined RLM resource, detecting an RLF of the first radio link, determining that the first TRP is associated with the RLF of the first radio link based on the RLM resource of the first radio link, and transmitting an RLF notification indicating the RLF of the first radio link.

28 Claims, 12 Drawing Sheets

(51) Int. Cl.
| | |
|---|---|
| *H04B 7/06* | (2006.01) |
| *H04W 56/00* | (2009.01) |
| *H04W 76/19* | (2018.01) |
| *H04W 76/27* | (2018.01) |
| *H04W 76/15* | (2018.01) |
| *H04W 24/08* | (2009.01) |
| *H04W 72/04* | (2009.01) |

(52) U.S. Cl.
CPC ......... *H04W 24/08* (2013.01); *H04W 56/001* (2013.01); *H04W 72/0493* (2013.01); *H04W 76/19* (2018.02); *H04W 76/27* (2018.02)

(58) Field of Classification Search
CPC .. H04W 56/001; H04W 76/15; H04B 7/0626; H04B 7/0486
See application file for complete search history.

(56) References Cited

U.S. PATENT DOCUMENTS

| | | | | |
|---|---|---|---|---|
| 2020/0350972 | A1* | 11/2020 | Yi | H04L 5/0051 |
| 2021/0014711 | A1* | 1/2021 | Miao | H04B 17/24 |
| 2021/0235500 | A1* | 7/2021 | Hong | H04W 76/18 |

OTHER PUBLICATIONS

"3rd Generation Partnership Project; Technical Specification Group Radio Access Network; Study on NR-based Access to Unlicensed Spectrum (Release 16)", 3GPP Draft, 3GPP TR 38.889 V16.0.0 (Dec. 2018), 38889-G00, 3rd Generation Partnership Project (3GPP), Mobile Competence Centre, 650, Route Des Lucioles, F-06921 Sophia-Antipolis Cedex, France, Dec. 27, 2018, XP051575597, pp. 1-119, http://www.3gpp.org/ftp/tsg%5Fran/WG1%5FRL1/DRAFT/Clean%5Fversions/38889%2Dg00%2Ezip, [retrieved on Dec. 27, 2018].
Huawei, et al., "On Backhaul Link Radio Link Failure Handling for IAB", 3GPP Draft, 3GPP TSG RAN WG1 Meeting #98, R1-1909314, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, XP051765921, 2 pages, http://www.3gpp.org/ftp/tsg_ran/WG1_RL1/TSGR1_98/Docs/R1-1909314.zip [retrieved on Aug. 17, 2019].
International Search Report and Written Opinion—PCT/US2020/040880—ISA/EPO—dated Dec. 8, 2020.
International Search Report and Written Opinion—PCT/US2020/040880—ISA/EPO—dated Feb. 12, 2021.
LG Electronics: "Minimal Service Interruption with Mutiple BH RLF Notification Types", 3GPP Draft, 3GPP TSG-RAN WG2 Meeting #107, R2-1911478 [IAB] Minimal Service Interruption with Mutiple BH RLF Notification Types, 3rd Generation Partnership Project (3GPP), Mobile Competence Centre, 650, Route Des Lucioles, F-06921, Sophia-Antipolis Cedex, France, vol. RAN WG2, No. Prague, Czeck, Aug. 26, 2019-Aug. 30, 2019, Aug. 16, 2019, XP051769234, 4 pages, http://www.3gpp.org/ftp/tsg_ran/WG2_RL2/TSGR2_107/Docs/R2-1911478.zip [retrieved on Aug. 16, 2019].
Partial International Search Report—PCT/US2020/040880—ISA/EPO—dated Oct. 14, 2020.
3GPP TS 38.213 v15.6.0 Release 15, Physical Layer Procedures for Control, ETSI TS 138 213 (Jul. 2019).

\* cited by examiner

MULTI-TRANSMISSION AND RECEPTION POINT (TRP) LINK FAILURE PROCEDURES

CROSS-REFERENCE TO RELATED APPLICATION(S)

This application claims benefit of and priority to U.S. Provisional Application No. 62/891,016, filed Aug. 23, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for user equipment (UE) handling of multi-transmission reception point (TRP) link failures.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved radio link monitoring (RLM) and radio link failure (RLF) procedures for multi-TRP systems.

Certain aspects provide a method of wireless communication by a user equipment (UE). The method generally includes establishing a plurality of radio links between the UE and a first transmission reception point (TRP) and a second TRP, wherein the first TRP is part of a first cell group comprising the first TRP and one or more additional TRPs. The method may also include determining a radio link monitoring (RLM) resource of a first radio link of the plurality of radio links, and monitoring the first radio link according to the determined RLM resource. The method may also include detecting a radio link failure (RLF) of the first radio link, and determining that the first TRP is associated with the RLF of the first radio link based on the RLM resource of the first radio link. The method may also include transmitting an RLF notification indicating the RLF of the first radio link.

Certain aspects provide for a UE that includes a memory and a processor communicatively coupled to the memory, wherein the processor is configured to: establish a plurality of radio links between the UE and a first transmission reception point (TRP) and a second TRP, wherein the first TRP is part of a first cell group comprising the first TRP and one or more additional TRPs. The processor may also be configured to determine a radio link monitoring (RLM) resource of a first radio link of the plurality of radio links. The processor may also be configured to monitor the first radio link according to the determined RLM resource. The processor may also be configured to detect a radio link failure (RLF) of the first radio link. The processor may also be configured to determine that the first TRP is associated with the RLF of the first radio link based on the RLM resource of the first radio link. The processor may also be configured to transmit an RLF notification indicating the RLF of the first radio link.

Certain aspects provide for an apparatus for wireless communication. In some examples, the apparatus comprises means for establishing a plurality of radio links between the apparatus and a first transmission reception point (TRP) and a second TRP, wherein the first TRP is part of a first cell group comprising the first TRP and one or more additional TRPs. In some examples, the apparatus comprises means for determining a radio link monitoring (RLM) resource of a first radio link of the plurality of radio links. In some examples, the apparatus comprises means for monitoring the first radio link according to the determined RLM resource. In some examples, the apparatus comprises means for detecting a radio link failure (RLF) of the first radio link. In some examples, the apparatus comprises means for determining that the first TRP is associated with the RLF of the first radio link based on the RLM resource of the first radio link. In some examples, the apparatus comprises means for transmitting an RLF notification indicating the RLF of the first radio link.

Certain aspects provide for a non-transitory computer-readable storage medium having instructions stored thereon for performing a method of wireless communication by a user equipment (UE). In some examples, the method comprises establishing a plurality of radio links between the UE and a first transmission reception point (TRP) and a second TRP, wherein the first TRP is part of a first cell group comprising the first TRP and one or more additional TRPs. In some examples, the method comprises determining a radio link monitoring (RLM) resource of a first radio link of the plurality of radio links. In some examples, the method comprises monitoring the first radio link according to the determined RLM resource. In some examples, the method comprises detecting a radio link failure (RLF) of the first radio link. In some examples, the method comprises determining that the first TRP is associated with the RLF of the first radio link based on the RLM resource of the first radio link. In some examples, the method comprises, transmitting an RLF notification indicating the RLF of the first radio link.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for performing radio link monitoring (RLM) and/or radio link failure (RLF) procedures in systems where a UE is communicating with multiple transmitter receiver points (TRPs).

The following description provides examples of techniques for performing radio link monitoring (RLM) and radio link failure procedures in multiple-TRP (mTRP) communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
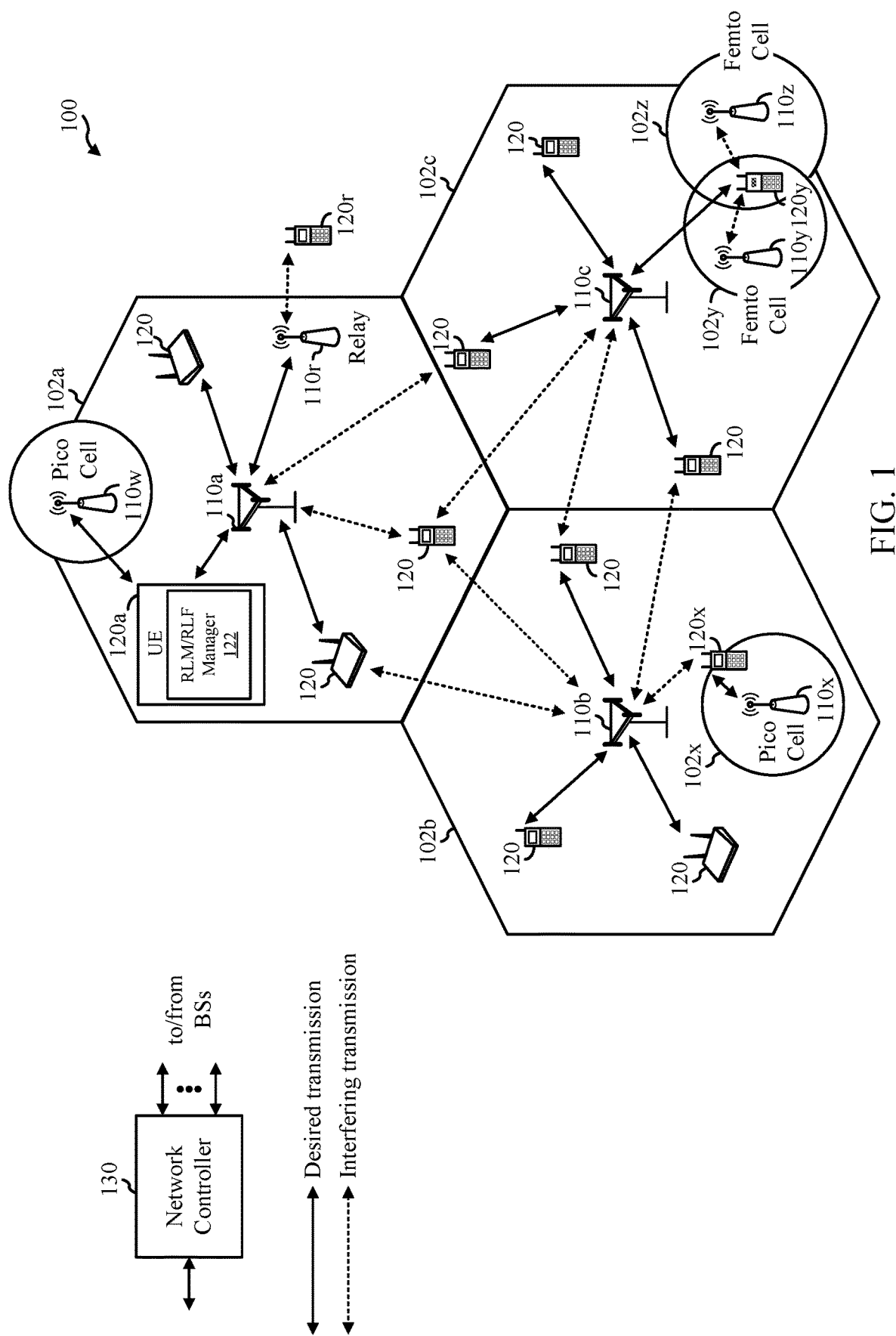
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and/or TRPs controlled thereby, and other network entities. BSs 110 may be involved in a multiple transmission reception point (multi-TRP) transmission to a UE 120 and may participate in RLM and/or RLF procedures as described herein.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for performing radio link monitoring (RLM) and radio link failure (RLF) procedures in multiple-TRP (mTRP) communications. As shown in FIG. 1, the UE 120a includes an RLM/RLF manager 122. The RLM/RLF manager 122 may be configured to establish a plurality of radio links between the UE and a first transmission reception point (TRP) (e.g., pico cell 110w) and a second TRP (e.g., base station 110a), determine an RLM resource of a first radio link of the plurality of radio links, and monitor the first radio link according to the determined RLM resource. In certain aspects, the RLM/RLF manager 122 may be configured to detect a RLF of the first radio link and transmit an RLF notification indicating the RLF of the first radio link, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
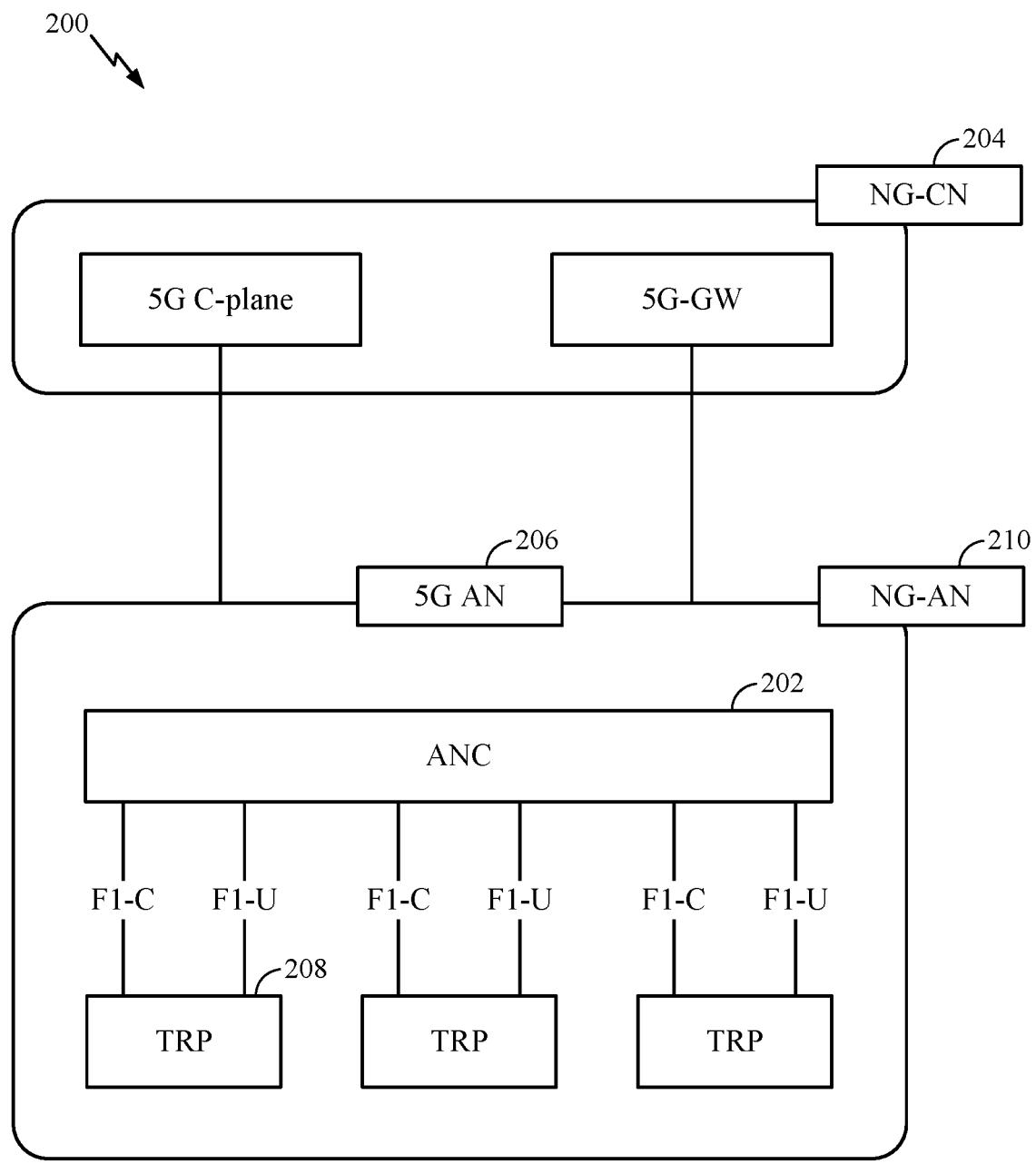
FIG. 2 is a block diagram illustrating an example logical architecture of a distributed radio access network (RAN), which may be implemented in the wireless communication network illustrated in FIG. 1.

FIG. 2 is a block diagram illustrating an example logical architecture of a distributed radio access network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the next generation core network (NG-CN) 204 may terminate at ANC 202. The backhaul interface to neighboring next generation access nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support front-hauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common front-haul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. For example, a radio resource control (RRC) layer, a packet data convergence protocol (PDCP) layer, a radio link control (RLC) layer, a medium access control (MAC) layer, and a physical (PHY) layer may be adaptably placed at the TRP 208 or ANC 202.

Figure 3:
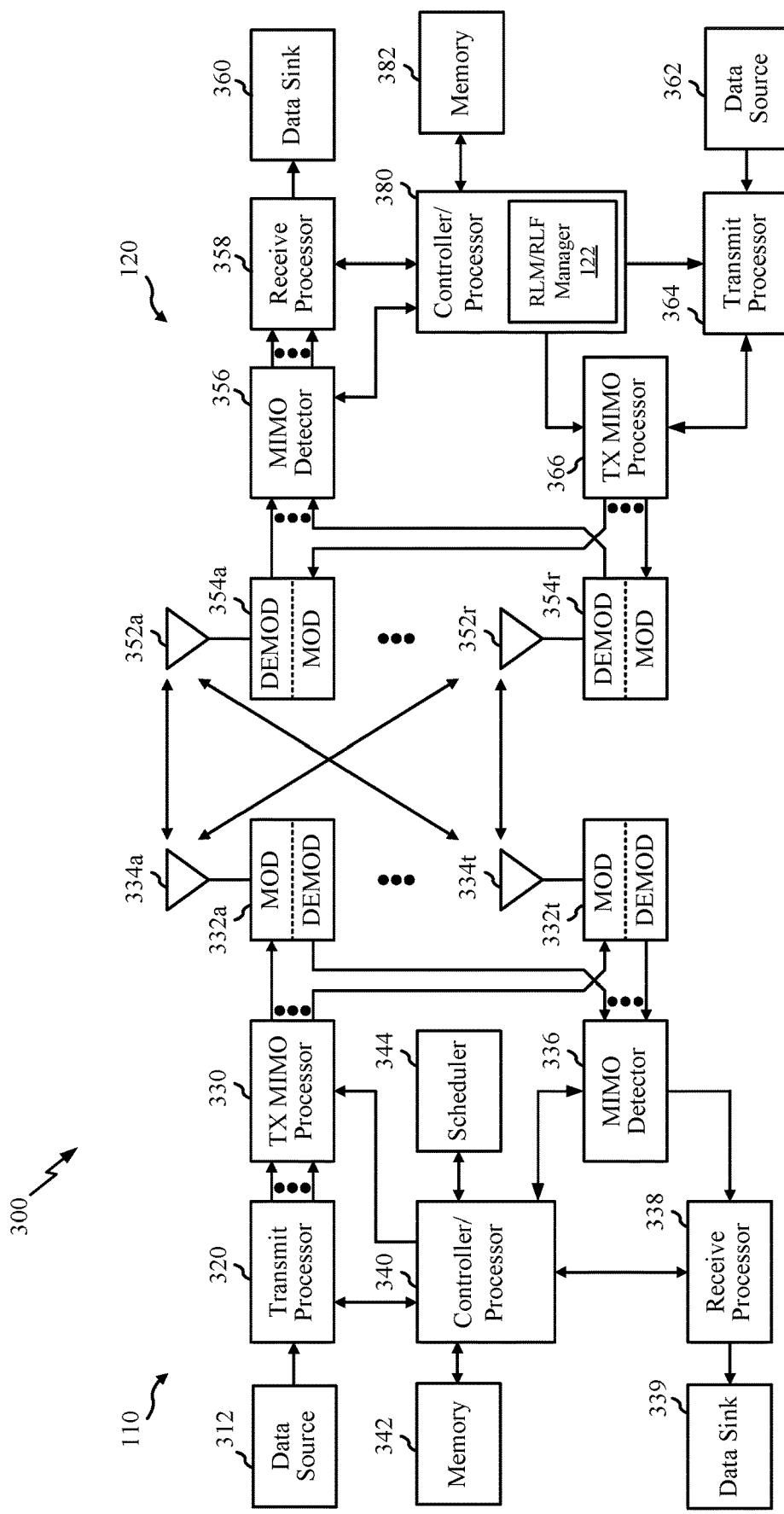
FIG. 3 is a block diagram illustrating example components of a base station (BS) and a user equipment (UE), in accordance with certain aspects of the present disclosure.

FIG. 3 is a block diagram illustrating example components 300 of BS 110a and UE 120a (e.g., in the wireless communication network 100 of FIG. 1), which may be used to implement aspects of the present disclosure.

At the BS 110a, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a-332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal.

Downlink signals from modulators 332a-332t may be transmitted via the antennas 334a-334t, respectively.

At the UE 120a, the antennas 352a-352r may receive the downlink signals from the BS 110a and may provide received signals to the demodulators (DEMODs) in transceivers 354a-354r, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators 354a-354r, perform MIMO detection on the received symbols if applicable, and provide detected symbols. A receive processor 358 may process (e.g., demodulate, deinterleave, and decode) the detected symbols, provide decoded data for the UE 120a to a data sink 360, and provide decoded control information to a controller/processor 380.

On the uplink, at UE 120a, a transmit processor 364 may receive and process data (e.g., for the physical uplink shared channel (PUSCH)) from a data source 362 and control information (e.g., for the physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a-354r (e.g., for SC-FDM, etc.), and transmitted to the BS 110a. At the BS 110a, the uplink signals from the UE 120a may be received by the antennas 334, processed by the modulators 332, detected by a MIMO detector 336 if applicable, and further processed by a receive processor 338 to obtain decoded data and control information sent by the UE 120a. The receive processor 338 may provide the decoded data to a data sink 339 and the decoded control information to the controller/processor 340.

The memories 342 and 382 may store data and program codes for BS 110a and UE 120a, respectively. A scheduler 344 may schedule UEs for data transmission on the downlink and/or uplink.

The controller/processor 380 and/or other processors and modules at the UE 120a may perform or direct the execution of processes for the techniques described herein. As shown in FIG. 3, the controller/processor 380 of the UE 120a has an RLM/RLF manager 122 that may be configured for establishing a plurality of radio links between the UE and a first transmission reception point (TRP) and a second TRP, determining an RLM resource of a first radio link of the plurality of radio links, monitoring the first radio link according to the determined RLM resource, detecting a RLF of the first radio link, and transmitting an RLF notification indicating the RLF of the first radio link, in accordance with aspects of the present disclosure. Although shown at the controller/processor, other components of the UE 120a and BS 110a may be used performing the operations described herein.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 4:
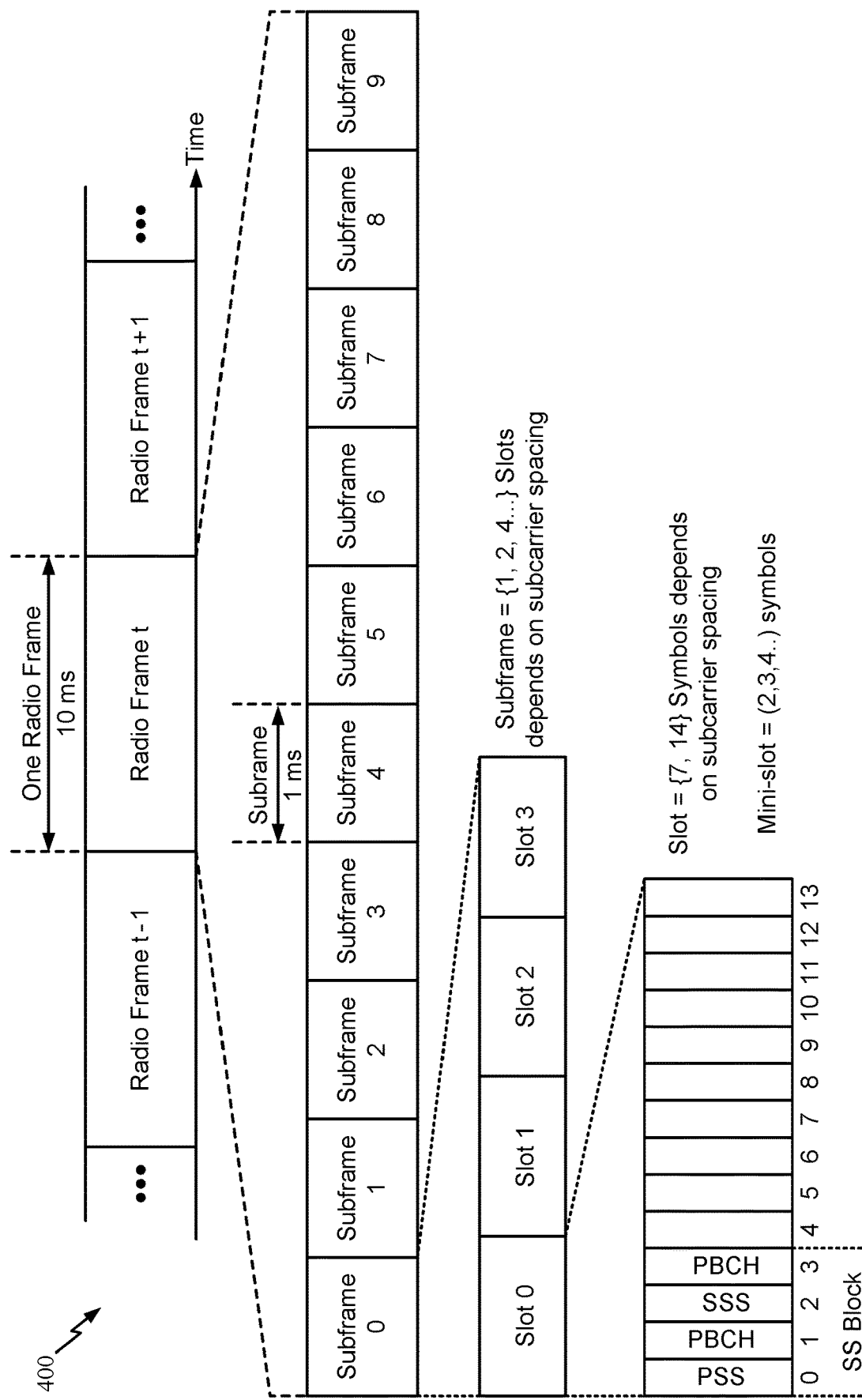
FIG. 4 is a diagram showing an example of a frame format for NR, in accordance with certain aspects of the present disclosure.

FIG. 4 is a diagram showing an example of a frame format 400 for NR. The transmission timeline for each of a downlink and an uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Figure 6:
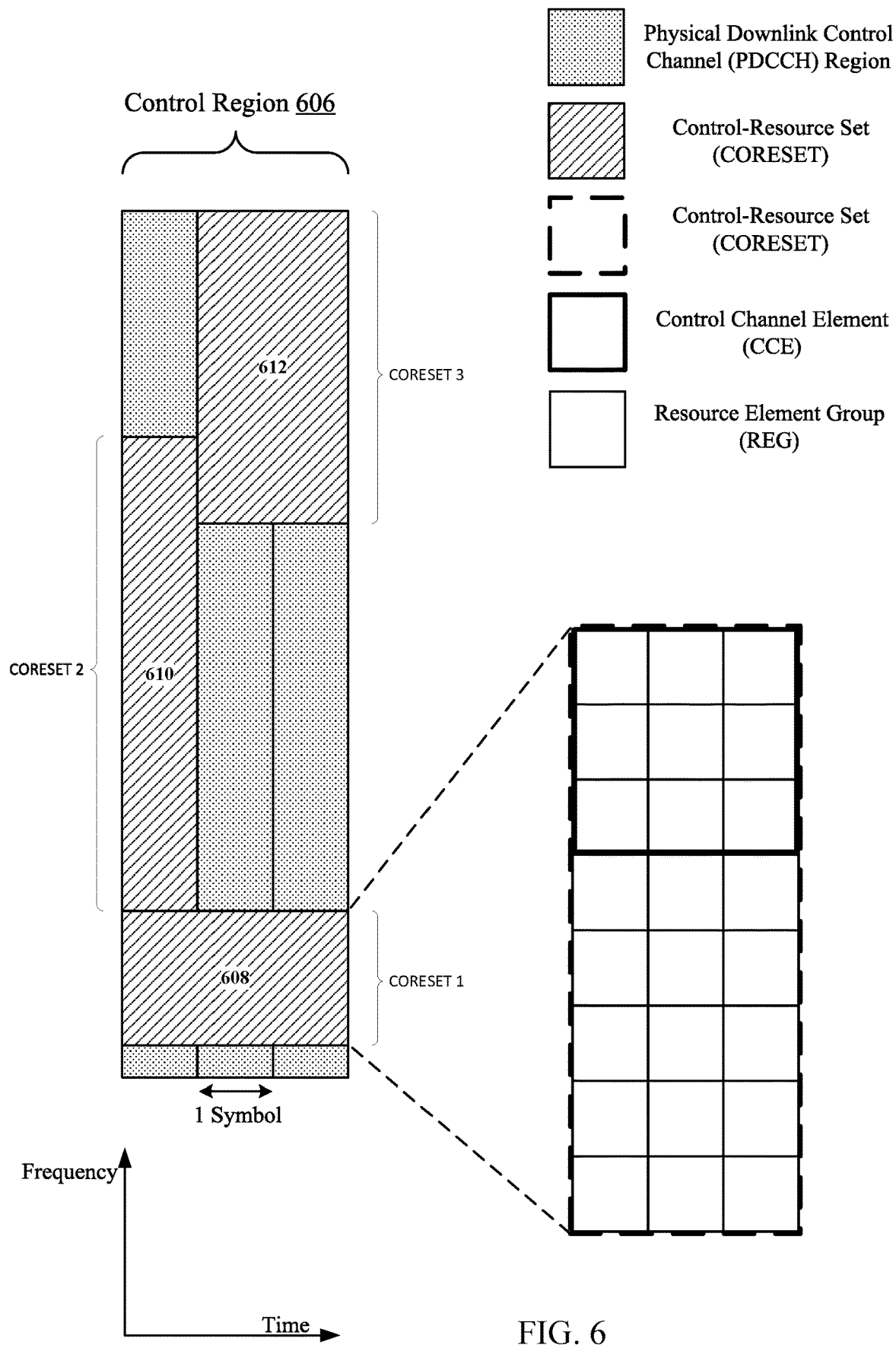
FIG. 6 is a block diagram illustrating example control resource sets (CORESETs) of a downlink (DL) control region, in accordance with certain aspects of the present disclosure.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

As described in more detail below with reference to FIGS. 5A and 5B, each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 5A:
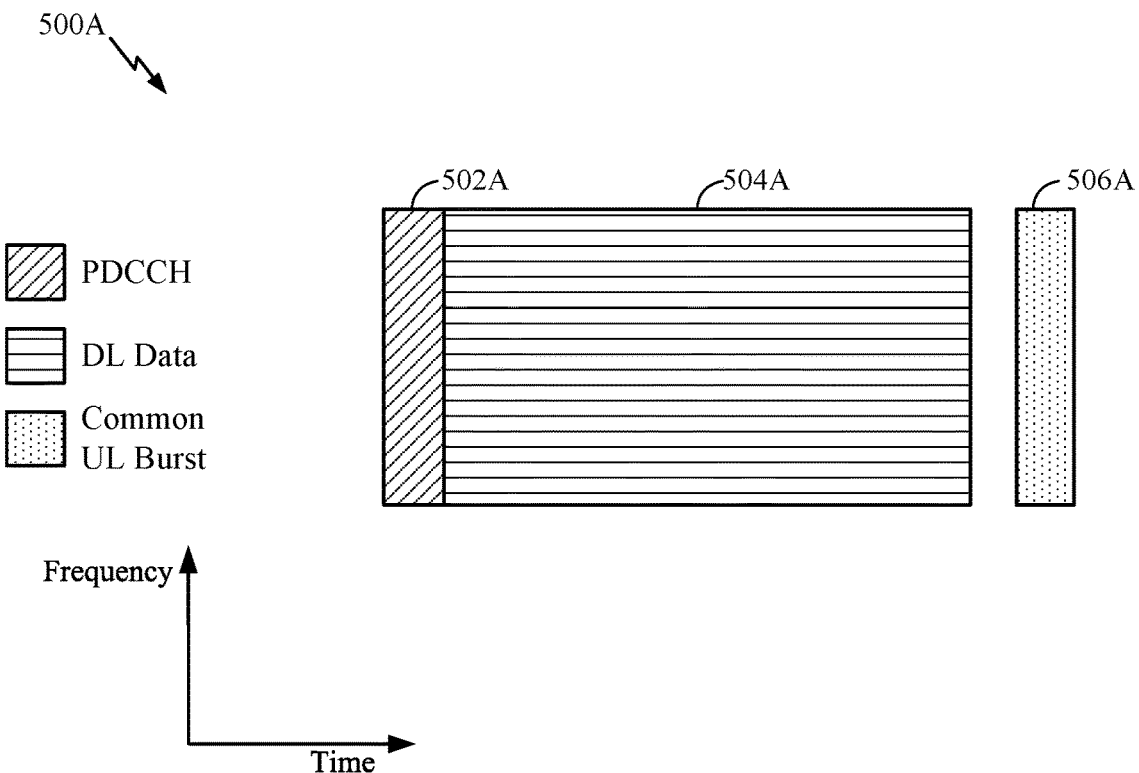
FIG. 5A is a block diagram illustrating an example of a DL-centric subframe, in accordance with certain aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity (e.g., UE or BS) to the subordinate entity (e.g., UE). In some configurations, the DL data portion 504A may be a physical DL shared channel (PDSCH).

The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506A may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 5B:
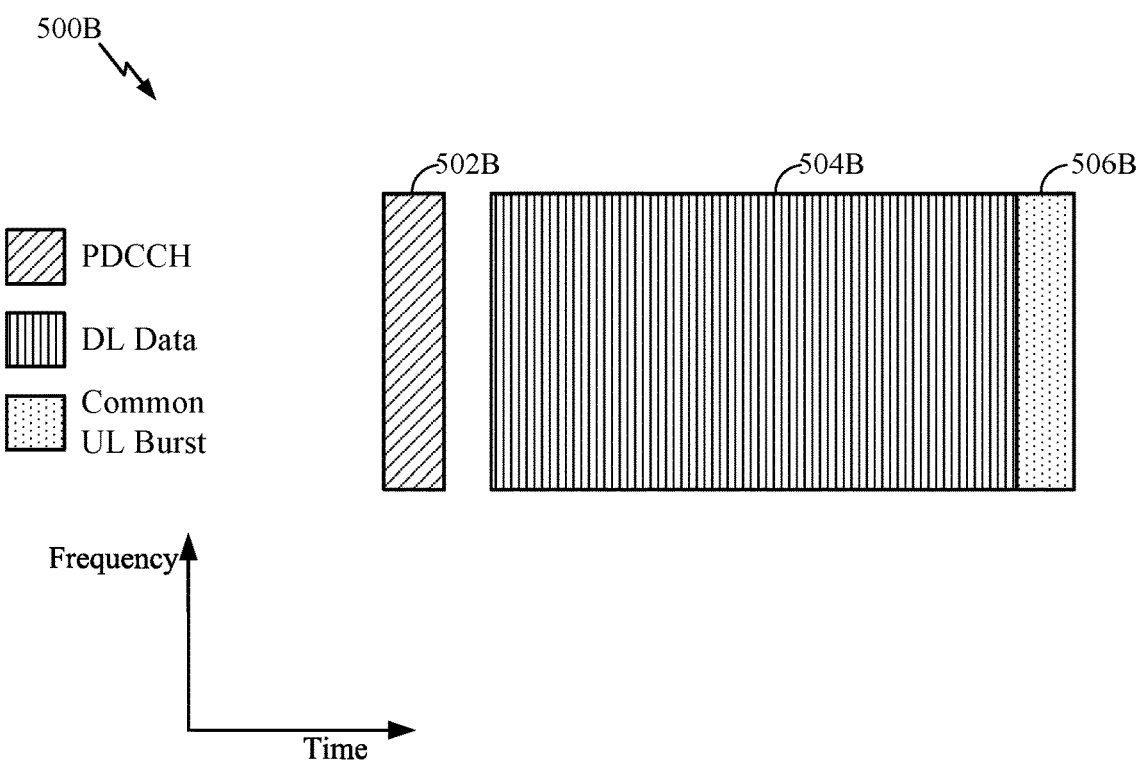
FIG. 5B is a block diagram illustrating an example of a DL-centric subframe, in accordance with certain aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

FIG. 6 is a block diagram illustrating three example control resource sets (CORESETs) of a DL control region 606, such as the DL control region shown in FIGS. 5A and 5B. A CORESET for an OFDMA system (e.g., a communications system transmitting PDCCH using OFDMA waveforms) may comprise one or more control resource (e.g., time and frequency resources) sets, configured for conveying PDCCH, within the system bandwidth. In LTE, a UE (e.g., UE 120a) generally monitors the entire DL control region 606 for its PDCCH. In 5G NR, the UE may be configured to monitor one or more CORESETs so that the UE is not monitoring the entire DL control region 606 bandwidth.

Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit PDCCHs, with different numbers of CCEs in the sets used to transmit PDCCHs using differing aggregation levels. Multiple sets of CCEs may be defined as search spaces for UEs, and thus a NodeB or other base station may transmit a PDCCH to a UE by transmitting the PDCCH in a set of CCEs that is defined as a decoding candidate within a search space for the UE, and the UE may receive the PDCCH by searching in search spaces for the UE and decoding the PDCCH transmitted by the NodeB.

In this example, the DL control region 606 spans across three OFDM symbols. Each CORESET (608, 610, 612) is illustrated within a PDCCH region of the control region 606, and allocated to a specific set of resources within the respective PDCCH regions. Each CORESET may be configured in both the time and frequency domain, and multiple CORESETs may overlap or be non-overlapping in frequency and/or time for one or more UEs 120. Each CORESET may span across one or more OFDM symbols.

A first CORESET 608 is indexed as "CORESET 1" and is shown as occurring during three OFDM symbols in the time domain and occupying a first region of resources in the frequency domain of the DL control region 606. The first CORESET 608 may include twenty-four REGs and at least one CCE. A second CORESET 610 is indexed as "CORESET 2" and is shown as occurring during one OFDM symbol in the time domain and occupying a second region of resources in the frequency domain. A third CORESET 612 is indexed as "CORESET 3" and is shown as occurring during two symbols in the time domain and occupying a third region of resources in the frequency domain.

In certain systems (e.g., NR release 16), the UE may communicate using multiple TRP (mTRP) systems to increase system capacity and reliability. For example, FIGS. 7A and 7B provide diagrams illustrating two modes for mTRP communication with a UE, according to certain aspects.

Figure 7A:
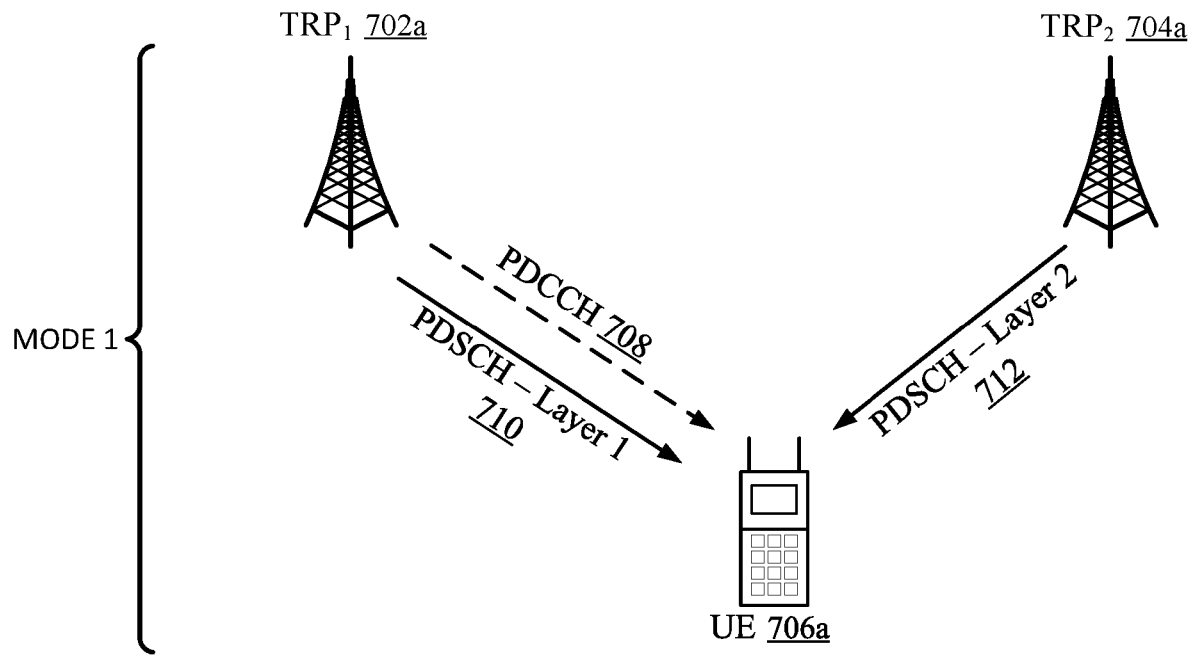
FIG. 7A is a diagram illustrating a first mode for multiple TRP (mTRP) communication with a UE, in accordance with certain aspects of the present disclosure.

In a first mode (Mode 1), a single PDCCH 708 schedules single PDSCH (e.g., PDSCH—layer 1 710 and PDSCH—layer 2 712) from multiple TRPs (e.g., a first TRP 702a and a second TRP 704a), as illustrated in FIG. 7A. In this mode, different TRPs may transmit different spatial layers in overlapping RBs/symbols (spatial division multiplexing-SDM) to a UE 706a. The different TRPs may transmit in different RBs (frequency division multiplexing-FDM) and may transmit in different OFDM symbols (time division multiplexing-TDM). This mode assumes a backhaul with little or virtually no delay.

Figure 7B:
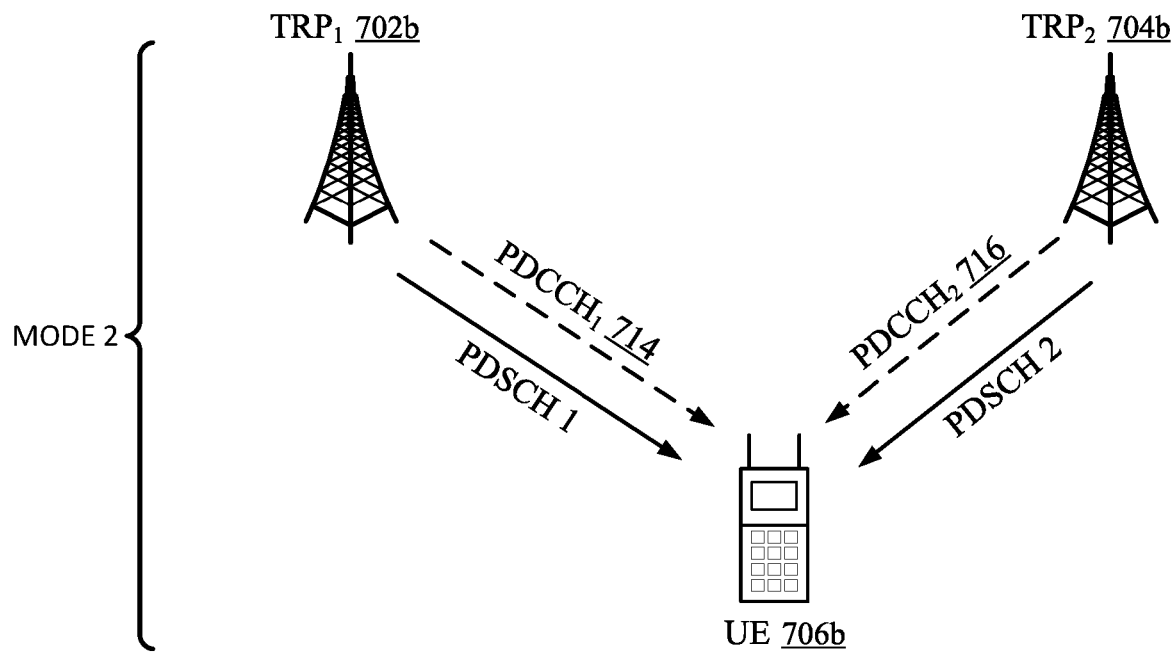
FIG. 7B is a diagram illustrating a second mode for multiple TRP (mTRP) communication with a UE, in accordance with certain aspects of the present disclosure.

In a second mode (Mode 2), multiple PDCCHs (a first PDCCH 714 and a second PDCCH 716) schedule respective PDSCHs from multiple TRPs (e.g., a first TRP 702b and a second TRP 704b), as shown in FIG. 7B. This mode can be utilized in both non-ideal and ideal backhauls. To support multiple PDCCH monitoring, up to 5 CORESETs can be configured with up to 3 CORESETs per TRP. As used herein, the term CORESET generally refers to a set of physical resources and a set of parameters that is used to carry PDCCH/DCI to, in this example, a UE 706b. For example, a CORESET may by similar in area to an LTE PDCCH area (e.g., the first 1, 2, 3, 4 OFDM symbols in a subframe).

In some cases, TRP differentiation at the UE side may be based on CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. Otherwise, the notion of different TRPs may be transparent to the UE.

In multiple beam systems like the examples shown in FIGS. 7A and 7B, radio link monitoring (RLM) may be provided. NR may support at least two types of reference signals (RS) for RLM. For example, NR may support synchronization signal (SS) block (SSB) type reference signals, such as those described above with reference to FIG. 4, and may also support channel state information references signals (CSI-RS).

A hypothetical physical downlink control channel (PDCCH) block error rate (BLER) may be one metric used for determining in-synch (IS) and/or out-of-synch (OOS) RLM conditions. NR may support configuration of specific RLM reference signal (RLM-RS) of an RLM-RS resource set that includes one or more (e.g., multiple) resources for a given UE. For example, a UE may be explicitly configured with a CSI-RS resource set configuration index or a SS/PBCH block index by an RRC configuration message from a TRP or another network node after connection is established between the UE and the TRP. However, in some examples, the UE may not be explicitly provided with a specific RLM-RS. Accordingly, the UE may use the periodic CSI-RS corresponding to a TCI state associated with a particular CORESET for RLM-RS determination. Thus, procedures for determining an RLM-RS associated with a CORESET of a radio link with a TRP provide a technical improvement to mobile communications.

Moreover, current systems do not provide RLM and RLF procedures for a UE in mTRP communications. Thus, a defined set of procedures for UE operation would provide a technical improvement to mobile communications. Although the techniques described herein are provided in the context of examples involving two TRPs, it should be noted that the techniques can be applied to any number of multiple TRPs.

Examples for Determining a Single RLM-RS for Multiple TRP Communication

Figure 8:
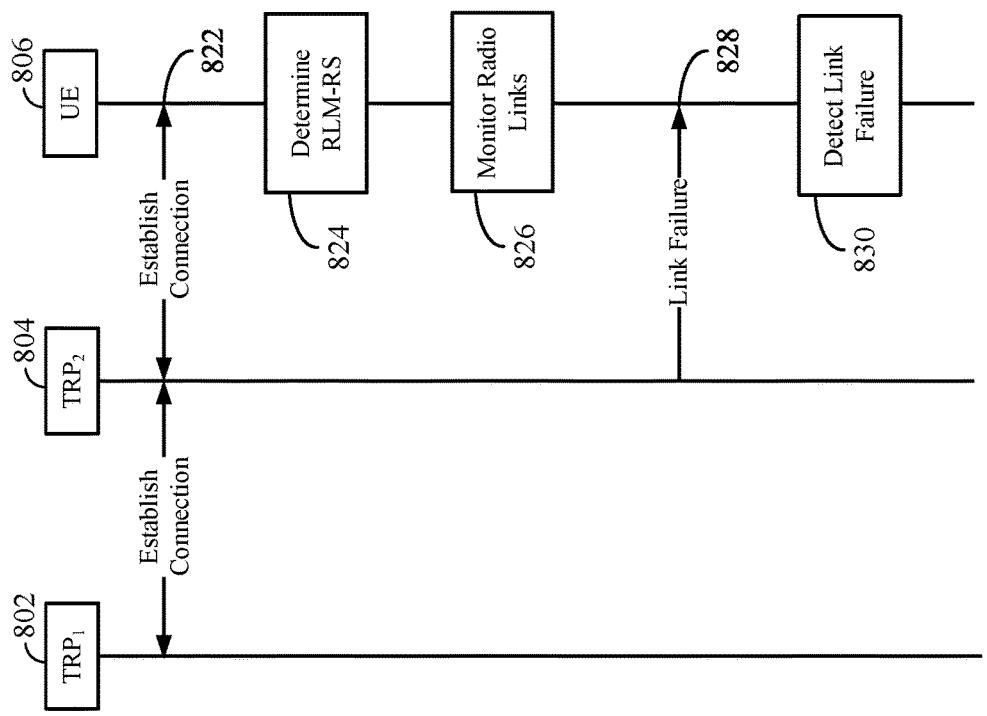
FIG. 8 is a diagram and a corresponding call flow diagram illustrating an example process for determining a single RLM reference set (RS) in an mTRP communication, in accordance with certain aspects of the present disclosure.
Figure 8:
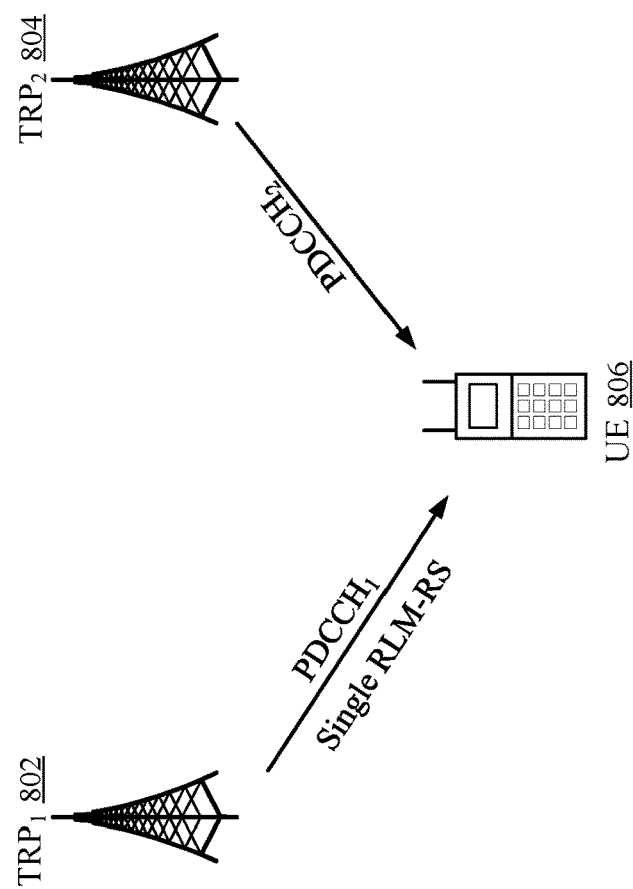

FIG. 8 is a diagram and a corresponding call flow diagram illustrating an example process for determining a single RLM-RS in an mTRP communication. In this example, at a first communication 822, a UE 806 establishes an initial connection with a first TRP 802 and a second TRP 804. In some examples, the initial connection is established via RRC configuration messaging or physical random access channel (PRACH) processes. In some aspects, the initial connection establishes a plurality of radio links between the UE and the first TRP 802 and the second TRP 804. In certain aspects, both of the first TRP 802 and the second TRP 804 may belong to one or more base stations. However, in other aspects, one or more of the first TRP 802 and the second TRP 804 may be a base station (e.g., gNB).

At a first step 824, the UE 806 then determines a single RLM-RS that corresponds to one of the TRPs (e.g., the first TRP 802). In some examples, an indication of the single RLM-RS is provided to the UE 806 during initial connection establishment. In other examples, the UE 806 is configured to derive the single RLM-RS based on a plurality of CORESETs associated with the control regions of the PDCCHs the UE is monitoring. As shown in FIG. 8, the UE 806 monitors a PDCCH from each of the first TRP 802 and the second TRP 804. Accordingly, the UE 806 can monitor a first set of CORESETs associated with a first PDCCH of the first TRP 802, and a second set of CORESETs associates with a second PDCCH of the second TRP 804.

In some aspects, if the RLM-RS is not provided to the UE 806, the UE 806 may determine the RLM-RS by ranking the plurality of CORESETs according to one or more of a monitoring periodicity or an index of each of the plurality of CORESETs to form a ranked set, at the first step 824. For example, if the UE 806 monitors three different CORESETs of the first PDCCH, then the UE will form a ranked set of the three different CORESETs according to their monitoring periodicity and/or index.

The UE 806 may then select a subset of CORESETs from the plurality of CORESETS, wherein the selection is based on an order of the ranked set. For example, the UE 806 may select two CORESETs having the highest monitoring periodicity of the three CORESETs. For example, a first CORESET may have a 1-slot monitoring period, a second CORESET may have a 2-slot monitoring period, and a third CORESET may have a 10-slot monitoring period. Accordingly, in this example, the first CORESET and the second CORESET have the highest monitoring periodicity of the first PDCCH, and may form the subset of CORESETs. In another example, the UE 806 may select two CORESETs having the lowest index of the three CORESETs. For example, a first CORESET may have an index of 1, a second CORESET may have an index of 2, and a third CORESET may have an index of 5. Accordingly, in this example, the first CORESET and the second CORESET have the lowest index of the first PDCCH, and may form the subset of CORESETs.

The UE 806 may then determine one or more of a channel state information (CSI) resource or a synchronization signal block (SSB) resource based on a transmission configuration indication (TCI) state associated with each of the selected subset of CORESETs. Accordingly, at a second step 826, the UE 806 can proceed to monitor the plurality of radio links established between the UE 806 and the first TRP 802 and second TRP 804. At a third step 830, the UE 806 may detect radio link failure (RLF) 828 of a second communication, involving a link between the second TRP 804 and the UE 806.

In certain aspects, the UE 806 may determine to rank CORESETs for each of the first TRP 802 and the second TRP 804 such that the derived RLM-RSs include resources from each TRP. In one example, the UE 806 may rank one or more CORESETs of a first set of CORESETs corresponding to the first TRP 802 according to one or more of a monitoring periodicity or an index of each CORESET of the first set of CORESETs to form a first rank set.

The UE 806 may also rank one or more CORESETs of a second set of CORESETs corresponding to the second TRP 804 according to one or more of a monitoring periodicity or an index of each CORESET of the second set of CORESETs to form a second ranked set. The UE 806 may then select a first subset of CORESETS of the first set of CORESETs, wherein the selection is based on an order of the first ranked set, and select a second subset of CORESETS of the second set of CORESETs, wherein the selection is based on an order of the second ranked set.

The UE 806 may then determine one or more of a CSI resource or an SSB resource based on a TCI state associated with each CORESET in the first subset of CORESETs and the second subset of CORESETs. Accordingly, the UE 806 can proceed to monitor (at the second step 826) the plurality of radio links established between the UE 806 and the first TRP 802 and second TRP 804 to detect (at the third step 830) RLF 828 using resources determined from each TRP.

Though certain aspects are described with respect to a PDCCH with multiple CORESETs being monitored by the UE 806, the aspects may similarly be applicable to a PDCCH with a single CORESET being monitored by the UE 806. In such an example, the UE 806 may determine one or more of the CSI resource or the SSB resource from the TCI state associated with the CORESET without having to rank and select a plurality of CORESETs.

Examples for Reporting RLF in Separate RLM-RS per TRP

Figure 9:
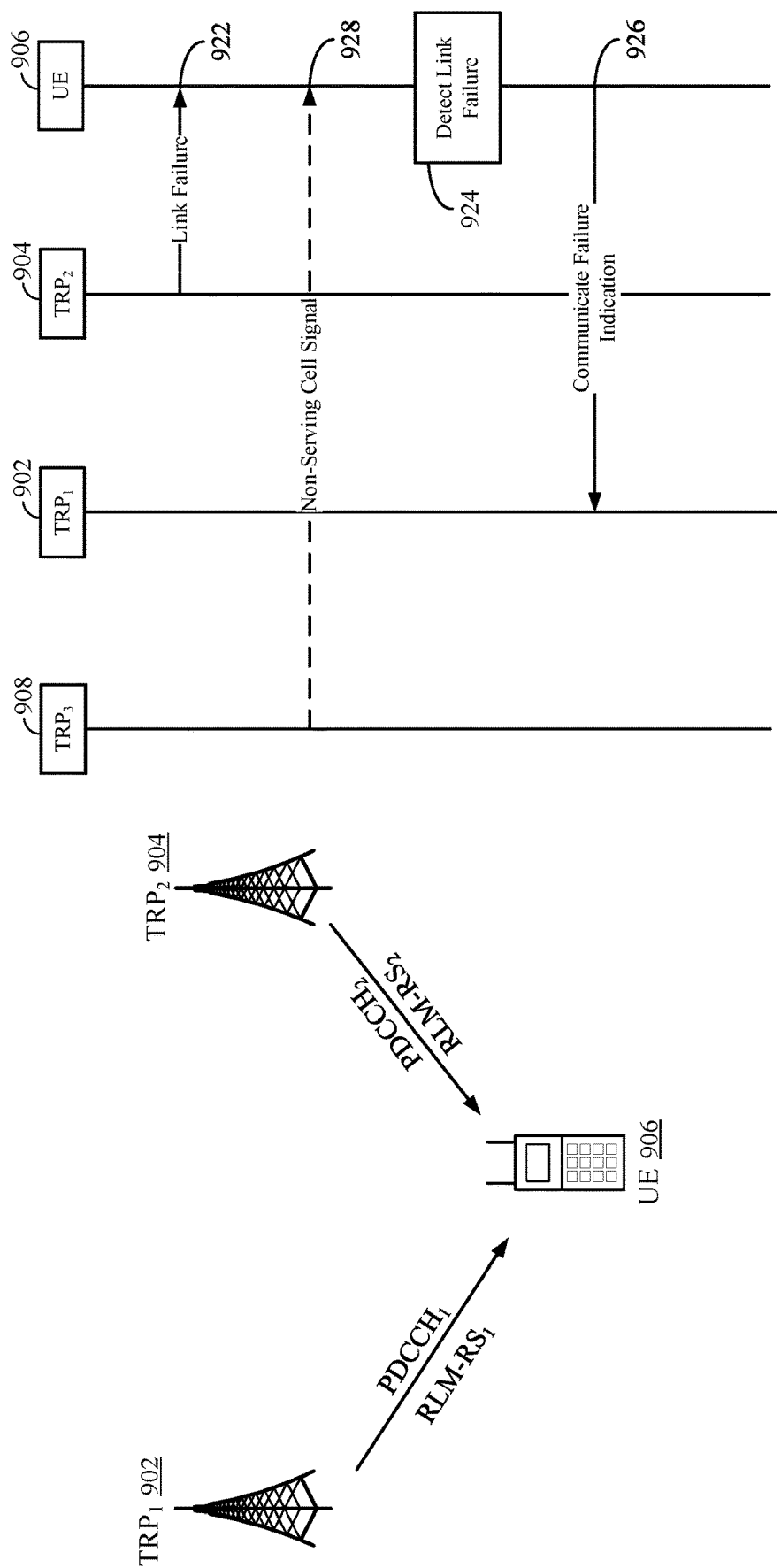
FIG. 9 is a diagram and a corresponding call flow diagram illustrating an example process for reporting a link failure in an mTRP communication, in accordance with certain aspects of the present disclosure.

FIG. 9 is a diagram and a corresponding call flow diagram illustrating an example process for reporting a link failure in an mTRP communication. As illustrated, each link between the UE 906 and the first TRP 902 and the second TRP 904 is characterized by a unique RLM-RS resource set. For example, the PDCCH link between the first TRP 902 and the UE 906 includes a first RLM-RS including one or more (e.g., multiple) RLM-RS resources, while the PDCCH link between the second TRP 904 and the UE 906 includes a second RLM-RS including one or more (e.g., multiple) resources set.

In some instances, the first TRP 902 is a master cell group (MCG) and the second TRP 904 is a secondary cell group (SCG). In some examples, the MCG is always active with respect to a UE 906 communication session, while the SCG may be a secondary cell (SCell) that can be configured/deconfigured and activated/deactivated depending on the UE data traffic.

In one example, the UE 906 may detect (e.g., at the first step 924) a link failure based on a first communication 922 between the UE 906 and the second TRP 904. For example, the UE 906 may determine that it is experiencing radio link failure based on the RLM-RS provided to it during link establishment, or that it is experiencing radio link failure based on the CSI-RS or SSB signaling determined using the steps described with respect to FIG. 8. In this example, the UE 906 can determine to notify the first TRP 902 of the detected link failure.

In certain aspects, the UE 906 determines which TRP is associated with the RLF of the radio link. In this example, the UE 906 may determine that the second TRP 904 is associated with the failed link. The UE 906 may then communicate an indication of the link failure to the other TRP (e.g., the first TRP 902) in a second communication 926.

Accordingly, when the UE 906 detects a link failure with the second TRP 904, the UE 906 may respond by sending a notification of the link failure to the first TRP 902. Similarly, when the UE 906 detects a link failure with the first TRP 902, the UE 906 may respond by sending a notification of the link failure to the second TRP 904.

In certain aspects, the failure indication communication (e.g., the second communication 926) may include available link measurements for links between each of the first TRP 902 and the second TRP 904. For example, in some configurations, the UE 906 may perform physical layer measurements of the links. The UE 906 may perform reference signal received power (RSRP), reference signal received quality (RSRQ), signal-to-interference-plus-noise ratio (SINR), reference signal received power per branch (RSRPB), etc. measurements on signals received over the links. Optionally, the UE 906 may perform measurements of signals received from non-serving cells (e.g., a signal 928 from a third TRP 908). Accordingly, the network may determine which TRPs are capable of communicating with the UE 906 based on the provided measurements.

In certain aspects, the UE 906 may initiate an RRC connection reestablishment process if RLF is experienced with both the first TRP 902 and the second TRP 904.

Examples for Reporting RLF in Dual-Connectivity Multiple TRP Communication

In some aspects of multiple TRP communications, a UE 906 may be communicatively coupled to a plurality of TRPs, wherein a first TRP 902 may be configured to operate a master cell group (MCG) including one or more cells (e.g., each cell may operate in different frequency bands and may include one or more component carriers (CCs)). A cell in the MCG may be configured as a first primary cell of the MCG. A second TRP 904 may be configured to operate a secondary cell group (SCG) including one or more cells (e.g., each cell may operate in different frequency bands and may include one or more CCs). A cell in the SCG may be designated as a first primary cell of the SCG.

Still referring to FIG. 9, the plurality of radio links may form an MCG and an SCG where mTRPs (e.g., the first TRP 902 and the second TRP 904) are associated with an MCG and/or SCG. For example, in carrier aggregation for dual connectivity (DC) (e.g., UE 906 connected to two non-collocated TRPs), the UE 906 may receive configuration information to communicate with the first TRP 902 through a first primary cell of the first TRP 902. The first TRP 902 may include an SCG group of cells, which includes one or more secondary cells and the primary cell of the first TRP 902. The UE 906 may also receive configuration information to communicate with a second TRP 904 through a second primary cell of the second TRP 904. The second TRP 904 may include an MCG group of cells, which includes one or more secondary cells and the primary cell or PCell of the second TRP. In general, with mTRP operation, the MCG may consist of multiple TRPs and SCG may consist of multiple TRPs as well. The TRPs involved in MCG may or may not be identical to those TRPs involved in SCG. In other words, the MCG may use TRP 0 and TRP1 while SCG may use TRP 2 and TRP' where TRP0 and TRP1 may or may not be the same as TRP 2 or TRP3.

In certain aspects, the UE 906 may be served by multiple carriers formed by the first TRP 902 and the second TRP 904. In split bearer DC, each of the first TRP 902 and the second TRP 904 may include aspects of both MCG and SCG. For example, the initial connection establishment between the UE 906 and the first TRP 902 and the second TRP 904 may establish a plurality of radio links between the UE and the first TRP and the second TRP. In some aspects, the plurality of radio links form an MCG and an SCG where each of the first TRP 902 and the second TRP 904 can be associated with one or both of the MCG and SCG. For example, one of the first TRP 902 or the second TRP 904 may be an MCG split bearer or an SCG split bearer. In some examples, a split bearer relates to a master node (e.g., the second TRP 904) that is interconnected to a secondary node (e.g., the first TRP 902) via a backhaul interface, allowing the master node and the secondary node to split data over the cell groups.

According to a first option for reporting RLF, the UE 906 may, at a first step 924, detect a link failure (e.g., at the first communication 922) between the UE 906 and a TRP, wherein the link failure corresponds to either of an MCG group of cells or an SCG group of cells corresponding to the second TRP 904. The UE 906 may then determine to transmit an RLF indication to a TRP different from the one the link failure is associated with (e.g., the UE 906 may transmit the RLF indication to the first TRP 902), where the RLF indication is communicated using the same cell group that the link failure is associated with.

For example, in the first option, detecting the RLF includes determining, by the UE 906, which TRP and which cell group (e.g., MCG or SCG) is associated with the RLF. In one example, the UE 906 determines that the link failure (e.g., at the first communication 922) is associated with an MCG link between the UE 906 and the second TRP 904. Accordingly, the UE 906 will transmit an RLF notification (e.g., the second communication 926) to the first TRP 902 using a MCG link between the UE 906 and the first TRP. Similarly, if the UE 906 determines that the link failure is associated with an SCG link associated with the first TRP 902, then the UE 906 will transmit an RLF notification to the second TRP using an SCG link.

Alternatively, if the UE 906 detects RLF associated with both the first TRP 902 and the second TRP 904 on the same cell group (e.g., MCG or SCG), then the UE 906 may transmit an indication of RLF to one or more of the mTRPs using the other cell group. For example, if the UE 906 detects an RLF associated with both the first TRP 902 and the second TRP 904 on the MCG, then the UE 906 may transmit an indication of RLF to one or more of the first TRP 902 or the second TRP using an SCG link.

According to a second option for reporting RLF, if the UE 906 detects (e.g., at the first step 924) a link failure between the UE 906 and a TRP, the UE 906 may transmit an RLF indication to either of the mTRPs using a link associated with a cell group that is not the same as the cell group associated with the link failure.

For example, in the second option, detecting the RLF includes determining, by the UE 906, which TRP and which cell group (e.g., MCG or SCG) is associated with the RLF. In one example, the UE 906 determines that the link failure (e.g., at the first communication 922) is associated with an MCG link between the UE 906 and the second TRP 904. Accordingly, the UE 906 will transmit an RLF notification (e.g., the second communication 926) using an SCG link between the UE 906 and the first TRP 902 or the second TRP 904. Similarly, if the UE 906 determines that the link failure is associated with an SCG link associated with the first TRP 902, then the UE 906 will transmit an RLF notification using an MCG link via either one of the TRPs associated with MCG link.

In certain aspects, whether the UE 906 transmits the RLF notification (e.g., the second communication 926) to the first TRP 902 or the second TRP 904, or transmits the RLF notification over a link on the same cell group associated with the failed link or another cell group, depends on a UE 906 implementation. In certain aspects, the UE 906 may initiate an RRC connection reestablishment when RLF is experienced by both of the mTRPs and both of the MCG and SCG.

Examples for Reporting Listen-Before-Talk Failure or Blocking Detection

In certain aspects, a UE may monitor radio links associated with mTRPs for blocking detection or to detect a listen-before-talk (LBT) failure of one or more of the radio links.

In some examples, UE is configured to monitor one of several different parameters of a radio link to determine whether blockage is occurring. For example, the UE can measure an RLM-RS of one or more resource sets, RSRP, RSRQ, RSSI, SINR, BLER, and/or CQI of the radio link. Such parameters may be compared with respective thresholds established by a user or network administrator. In other implementations, blockage may be identified from increasing latency of acknowledgments of RLC protocol data units (PDUs), increasing queuing time in layer 2 buffer, and degradation in successful delivery indication as HARQ ACK. In some examples, a UE may detect an LBT failure or a blockage via an initial signal or group common physical downlink control channel (GC-PDCCH) from each TRP.

Figure 10:
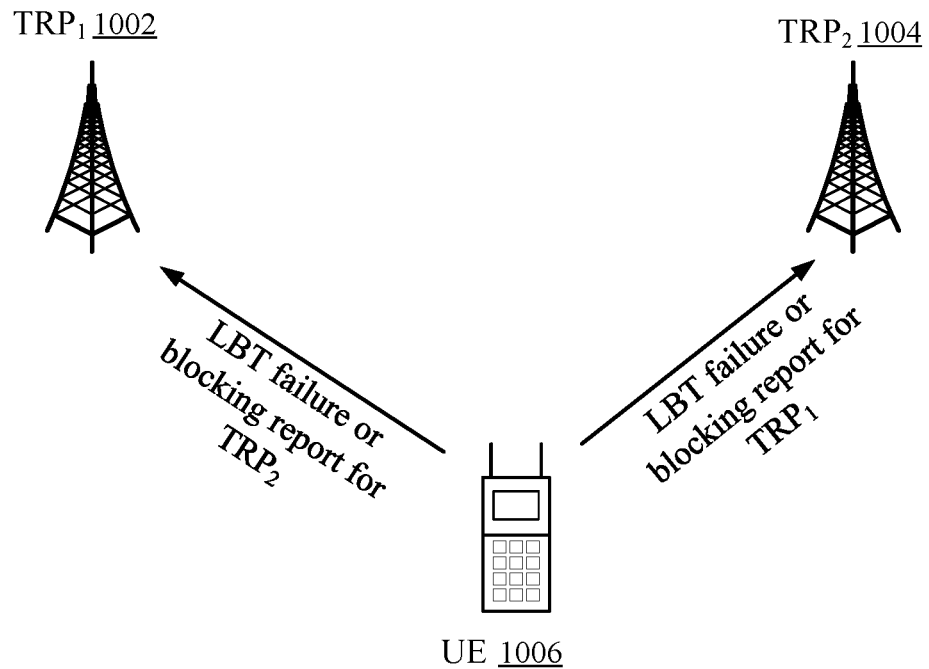
FIG. 10 is a diagram illustrating a communication between a UE and mTRPs, in accordance with certain aspects of the present disclosure.

FIG. 10 is a diagram illustrating a communication between a UE 1006 and mTRPs (e.g., a first TRP 1002 and a second TRP 1004), according to certain aspects. In this example, the UE 1006 may communicate a detected LBT failure or a blockage report for one TRP to the other TRP. For example, if the UE detects an LBT failure or blockage of a radio link between the UE 1006 and the first TRP 1002, then the UE 1006 may proceed to communicate a report indicative of the failure or the blockage to the second TRP 1004.

In some configurations, the TRP or serving base station may configure the UE 1006 with another TRP for mTRP operations. For example, if the UE 1006 communicates a report indicative of a failure or the blockage of a radio link between the UE 1006 and the first TRP 1002 to the second TRP 1004, the second TRP 1004 or a serving base station may configure (e.g., handover) the UE 1006 to communicate with a third TRP (not shown) while maintaining communication between the UE and the second TRP 1004.

In certain aspects, the second TRP 1004 or the serving base station may configure the UE 1006 for single TRP communication, maintaining the communication between the UE 1006 and the second TRP 1004.

Figure 11:
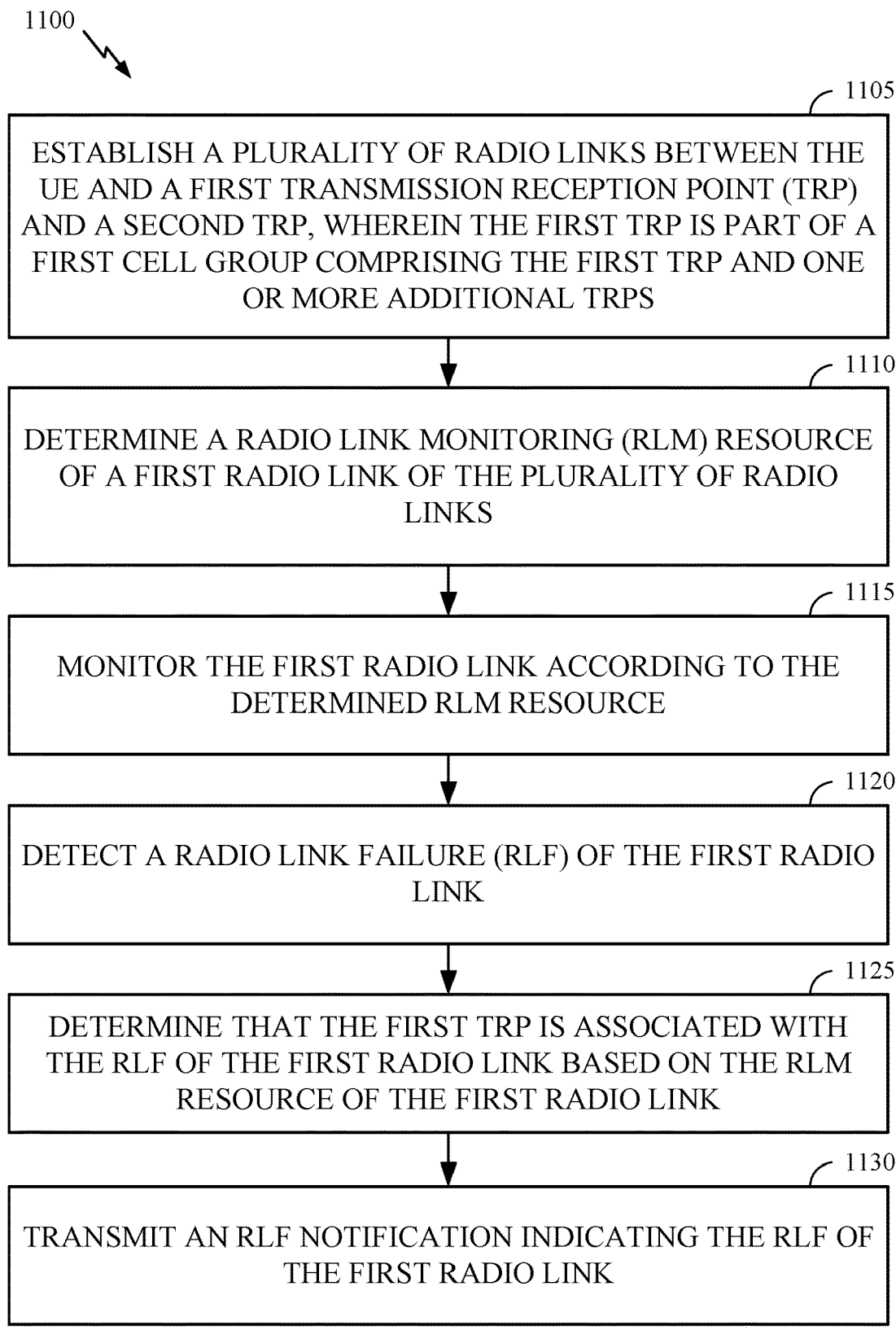
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., such as a UE 120 in the wireless communication network 100) operating in a multi-TRP mode (e.g., one of the modes shown in FIGS. 7A and 7B).

Operations 1100 may be implemented as software components that are executed and run on one or more processors (e.g., controller/processor 380 of FIG. 3). Further, the transmission and reception of signals by the UE in operations 1100 may be enabled, for example, by one or more antennas (e.g., antennas 352 of FIG. 3). In certain aspects, the transmission and/or reception of signals by the UE may be implemented via a bus interface of one or more processors (e.g., controller/processor 380) obtaining and/or outputting signals.

The operations 1100 may begin, at step 1105, by establishing a plurality of radio links between the UE and a first transmission reception point (TRP) and a second TRP, wherein the first TRP is part of a first cell group comprising the first TRP and one or more additional TRPs.

The operations 1100 may proceed to step 1110 by determining a radio link monitoring (RLM) resource of a first radio link of the plurality of radio links.

The operations 1100 may proceed to step 1115 by monitoring the first radio link according to the determined RLM resource.

The operations 1100 may proceed to step 1120 by detecting a radio link failure (RLF) of the first radio link.

The operations 1100 may proceed to step 1125 by determining that the first TRP is associated with the RLF of the first radio link based on the RLM resource of the first radio link.

The operations 1100 may proceed to step 1130 by transmitting an RLF notification indicating the RLF of the first radio link.

In certain aspects, determining the RLM resource comprises at least one of receiving, from at least one of the first TRP or the second TRP, an indication of the RLM resource, or deriving the RLM resource based on a plurality of CORESETs associated with the first TRP and the second TRP. In certain aspects, the plurality of CORESETs comprise a first set of CORESETs comprising one or more CORESETs associated with the first TRP, and a second set of CORESETs comprising one or more CORESETs associated with the second TRP.

In certain aspects, deriving the RLM resource based on the plurality of CORESETs further comprises ranking the plurality of CORESETs according to a monitoring periodicity of each of the plurality of CORESETs to form a ranked set, selecting a subset of CORESETs from the plurality of CORESETS, wherein the selection is based on an order of the ranked set, and determining one or more of a channel state information (CSI) resource or a synchronization signal block (SSB) resource based on a transmission configuration indication (TCI) state associated with each of the selected subset of CORESETs. In certain aspects, the subset of CORESETs is further selected based on CORESET index of the plurality of CORESETs.

In certain aspects, deriving the RLM resource based on the plurality of CORESETs further comprises ranking the one or more CORESETs of the first set of CORESETs according to a monitoring periodicity of each CORESET of the first set of CORESETs, wherein the CORESETs of the first set of CORESETs are ranked among each other to form a first ranked set, ranking the one or more CORESETs of the second set of CORESETs according to a monitoring periodicity of each CORESET of the second set of CORESETs, wherein the CORESETs of the second set of CORESETs are ranked among each other to form a second ranked set, selecting a first subset of CORESETS of the first set of CORESETs, wherein the selection is based on an order of the first ranked set, selecting a second subset of CORESETS of the second set of CORESETs, wherein the selection is based on an order of the second ranked set, and determining one or more of a channel state information (CSI) resource or a synchronization signal block (SSB) resource based on a transmission configuration indication (TCI) state associated with each CORESET in the first subset of CORESETs and the second subset of CORESETs.

In certain aspects, the first subset of CORESETs is further selected based on CORESET index of the first set of CORESETs.

In certain aspects, monitoring the first radio link according to the determined RLM resource comprises monitoring one or more of the plurality of radio links according to the determined CSI resource or SSB resource.

In certain aspects, transmitting the RLF notification comprises transmitting the RLF notification to the second TRP based on the determination that the first TRP is associated with the RLF of the first radio link.

In certain aspects, transmitting the RLF notification further comprises transmitting a link quality measurement, wherein the link quality measurement corresponds to one or more of: (i) the first radio link associated with the first TRP, (ii) a second radio link associated with the second TRP, or (iii) a third radio link associated with a non-serving TRP.

In certain aspects, the plurality of radio links forms the first cell group and a second cell group.

In certain aspects, detecting the RLF comprises detecting that the RLF is associated with the first cell group used by the first TRP, and further comprising determining whether the second TRP uses the first cell group, wherein transmitting the RLF notification comprises transmitting the RLF notification to the second TRP using the first cell group.

In certain aspects, detecting the RLF comprises detecting that the RLF is associated with the first cell group used by the first TRP, and further comprising: determining whether the second TRP uses the first cell group, wherein if the second TRP does not use the first cell group, the operations 1100 further comprises: selecting the first TRP or the second TRP based on one or more of an implementation of the UE or a network rule; and transmitting the RLF notification to the selected first TRP or second TRP using the second cell group.

In certain aspects, if the first TRP is selected, the operations 1100 further comprises transmitting the RLF notification to the selected first TRP over a fourth radio link of the plurality of radio links other than the first radio link.

In certain aspects, detecting the RLF comprises detecting the RLF is associated with the first cell group used by the first TRP and the second TRP, and wherein transmitting the RLF notification comprises transmitting the RLF notification to one or more of the first TRP or the second TRP using the second cell group.

In certain aspects, detecting RLF comprises detecting RLF associated with both the first cell group and the second cell group used by the first TRP and the second TRP, and further comprising initiating a radio resource control (RRC) connection re-establishment procedure between the UE and a network.

In certain aspects, wherein detecting the RLF of the first radio link comprises detecting a listen-before-talk failure.

Figure 12:
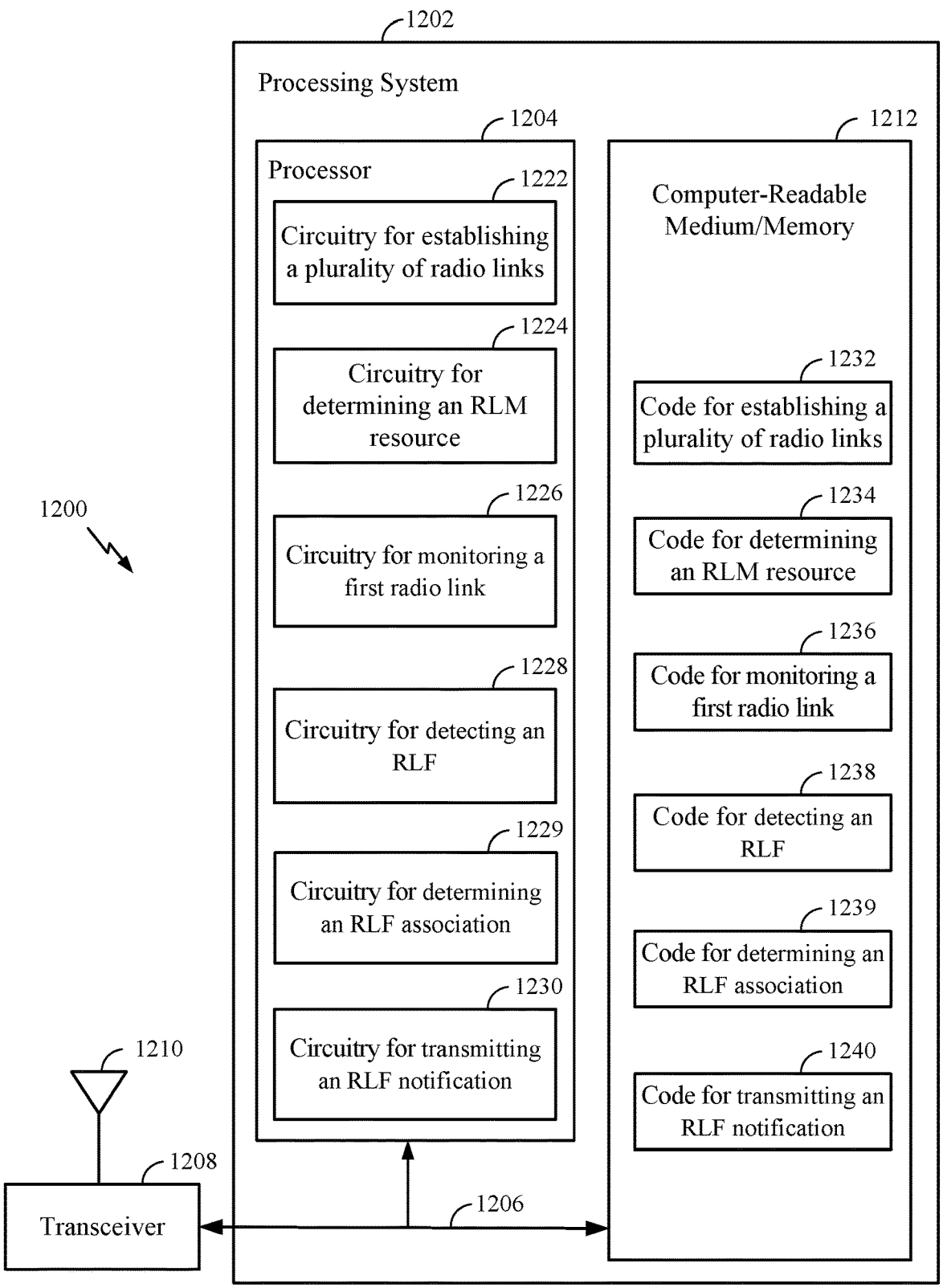
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 11. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 11, or other operations for performing the various techniques discussed herein for performing RLM and RLF procedures in mTRP communication scenarios. In certain aspects, computer-readable medium/memory 1212 stores code 1232 for establishing a plurality of radio links; code 1234 for determining an RLM resource; code 1236 for monitoring a first radio link; code 1238 for detecting an RLF; code 1239 for determining an RLF association; and code 1240 for transmitting an RLF notification.

In certain aspects, the processor 1204 has circuitry configured to implement the code stored in the computer-readable medium/memory 1212. The processor 1204 includes circuitry 1222 for establishing a plurality of radio links; circuitry 1224 for determining an RLM resource; circuitry 1226 for monitoring a first radio link; circuitry 1228 for detecting an RLF; circuitry 1229 for determining a RLF association; and circuitry 1230 for transmitting an RLF notification.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
   establishing a plurality of radio links between the UE and a plurality of transmission reception points (TRPs) including a first TRP and a second TRP, wherein the first TRP is part of a first cell group comprising the first TRP and one or more additional TRPs;
   determining a radio link monitoring (RLM) resource of a first radio link of the plurality of radio links, wherein determining the RLM resource comprises deriving the RLM resource based on a ranked set of a plurality of control resource sets (CORESETs) associated with the first TRP and the second TRP;
   monitoring the first radio link according to the determined RLM resource;
   detecting a radio link failure (RLF) of the first radio link;
   determining that the first TRP is associated with the RLF of the first radio link based on the RLM resource of the first radio link; and
   transmitting an RLF notification indicating the RLF of the first radio link.

2. The method of claim 1, wherein deriving the RLM resource based on the ranked set of the plurality of CORESETs further comprises:
   ranking the plurality of CORESETs according to a monitoring periodicity of each of the plurality of CORESETs to form the ranked set;
   selecting, based on an order of the ranked set, a subset of CORESETs from the plurality of CORESETS; and
   determining one or more of a channel state information (CSI) resource or a synchronization signal block (SSB) resource based on a transmission configuration indication (TCI) state associated with each of the selected subset of CORESETs.

3. The method of claim 1, wherein the plurality of CORESETs comprises:
   a first set of CORESETs comprising one or more CORESETs associated with the first TRP; and
   a second set of CORESETs comprising one or more CORESETs associated with the second TRP.

4. The method of claim 3, wherein deriving the RLM resource based on the ranked set of the plurality of CORESETs further comprises:
   ranking the one or more CORESETs of the first set of CORESETs according to a monitoring periodicity of each CORESET of the first set of CORESETs, wherein the CORESETs of the first set of CORESETs are ranked among each other to form a first ranked set;
   ranking the one or more CORESETs of the second set of CORESETs according to a monitoring periodicity of each CORESET of the second set of CORESETs, wherein the CORESETs of the second set of CORESETs are ranked among each other to form a second ranked set, wherein the ranked set includes the first ranked set and the second ranked set;
   selecting, based on an order of the first ranked set, a first subset of CORESETS of the first set of CORESETs;
   selecting, based on an order of the second ranked set, a second subset of CORESETS of the second set of CORESETs; and
   determining one or more of a channel state information (CSI) resource or a synchronization signal block (SSB) resource based on a transmission configuration indication (TCI) state associated with each CORESET in the first subset of CORESETs and the second subset of CORESETs.

5. The method of claim 1, wherein transmitting the RLF notification comprises transmitting the RLF notification to the second TRP based on the determination that the first TRP is associated with the RLF of the first radio link.

6. The method of claim 1, wherein transmitting the RLF notification further comprises transmitting a link quality measurement, wherein the link quality measurement corresponds to one or more of: (i) the first radio link associated with the first TRP, (ii) a second radio link associated with the second TRP, or (iii) a third radio link associated with a non-serving TRP.

7. The method of claim 1, wherein the plurality of radio links form the first cell group and a second cell group.

8. The method of claim 7, wherein detecting the RLF comprises detecting that the RLF is associated with the first cell group used by the first TRP, and further comprising:
   determining whether the second TRP uses the first cell group, wherein transmitting the RLF notification comprises transmitting the RLF notification to the second TRP using the first cell group.

9. The method of claim 7, wherein detecting the RLF comprises detecting that the RLF is associated with the first cell group used by the first TRP, and further comprising:
   determining whether the second TRP uses the first cell group, wherein if the second TRP does not use the first cell group, the method further comprises:
      selecting the first TRP or the second TRP based on one or more of an implementation of the UE or a network rule; and
      transmitting the RLF notification to the selected first TRP or second TRP using the second cell group.

10. The method of claim 7, wherein detecting the RLF comprises detecting that the RLF is associated with the first cell group used by the first TRP and the second TRP, and wherein transmitting the RLF notification comprises transmitting the RLF notification to one or more of the first TRP or the second TRP using the second cell group.

11. The method of claim 7, wherein detecting RLF comprises detecting RLF associated with both the first cell group and the second cell group used by the first TRP and the second TRP, and further comprising:
    initiating a radio resource control (RRC) connection re-establishment procedure between the UE and a network.

12. A user equipment (UE), comprising:
    a memory; and
    a processor communicatively coupled to the memory, wherein the processor is configured to:
       establish a plurality of radio links between the UE and a plurality of transmission reception points (TRPs) including a first TRP and a second TRP, wherein the first TRP is part of a first cell group comprising the first TRP and one or more additional TRPs;
       determine a radio link monitoring (RLM) resource of a first radio link of the plurality of radio links, wherein, to determine the RLM resource, the processor is further configured to derive the RLM resource based on a ranked set of a plurality of control resource sets (CORESETs) associated with the first TRP and the second TRP;
       monitor the first radio link according to the determined RLM resource;
       detect a radio link failure (RLF) of the first radio link;
       determine that the first TRP is associated with the RLF of the first radio link based on the RLM resource of the first radio link; and
       transmit an RLF notification indicating the RLF of the first radio link.

13. The UE of claim 12, wherein, to derive the RLM resource, the processor is further configured to:
    rank the plurality of CORESETs according to a monitoring periodicity of each of the plurality of CORESETs to form the ranked set;
    select, based on an order of the ranked set, a subset of CORESETs from the plurality of CORESETS; and
    determine one or more of a channel state information (CSI) resource or a synchronization signal block (SSB) resource based on a transmission configuration indication (TCI) state associated with each of the selected subset of CORESETs.

14. The UE of claim 13, wherein the subset of CORESETs is further selected based on a CORESET index of the plurality of CORESETs.

15. The UE of claim 12, wherein the plurality of CORESETs comprise:
    a first set of CORESETs comprising one or more CORESETs associated with the first TRP; and a second set of CORESETs comprising one or more CORESETs associated with the second TRP.

16. The UE of claim 15, wherein to derive the RLM resource, the processor is further configured to:
 rank the one or more CORESETs of the first set of CORESETs according to a monitoring periodicity of each CORESET of the first set of CORESETs, wherein the CORESETs of the first set of CORESETs are ranked among each other to form a first ranked set;
 rank the one or more CORESETs of the second set of CORESETs according to a monitoring periodicity of each CORESET of the second set of CORESETs, wherein the CORESETs of the second set of CORESETs are ranked among each other to form a second ranked set, wherein the ranked set includes the first ranked set and the second ranked set;
 select, based on an order of the first ranked set, a first subset of CORESETS of the first set of CORESETs;
 select, based on an order of the second ranked set, a second subset of CORESETS of the second set of CORESETs; and
 determine one or more of a channel state information (CSI) resource or a synchronization signal block (SSB) resource based on a transmission configuration indication (TCI) state associated with each CORESET in the first subset of CORESETs and the second subset of CORESETs.

17. The UE of claim 16, wherein the first subset of CORESETs is further selected based on a CORESET index of the first set of CORESETs.

18. The UE of claim 12, wherein, to transmit the RLF notification, the processor is further configured to transmit the RLF notification to the second TRP based on the determination that the first TRP is associated with the RLF of the first radio link.

19. The UE of claim 12, wherein, to transmit the RLF notification, the processor is further configured to transmit a link quality measurement, wherein the link quality measurement corresponds to one or more of: (i) the first radio link associated with the first TRP, (ii) a second radio link associated with the second TRP, or (iii) a third radio link associated with a non-serving TRP.

20. The UE of claim 12, wherein the plurality of radio links form the first cell group and a second cell group.

21. The UE of claim 20, wherein, to detect the RLF, the processor is further configured to:
 detect that the RLF is associated with the first cell group used by the first TRP,
 determine whether the second TRP uses the first cell group, and
 transmit the RLF notification to the second TRP using the first cell group.

22. The UE of claim 20, wherein, to detect the RLF, the processor is further configured to:
 detect that the RLF is associated with the first cell group used by the first TRP, and
 determine whether the second TRP uses the first cell group, wherein if the second TRP does not use the first cell group, the processor is further configured to:
  select the first TRP or the second TRP based on one or more of an implementation of the UE or a network rule; and
  transmit the RLF notification to the selected first TRP or second TRP using the second cell group.

23. The UE of claim 22, wherein if the first TRP is selected, the processor is further configured to transmit the RLF notification to the selected first TRP over a fourth radio link of the plurality of radio links.

24. The UE of claim 20, wherein, to detect the RLF, the processor is further configured to:
 detect the RLF is associated with the first cell group used by the first TRP and the second TRP, and
 transmit the RLF notification to one or more of the first TRP or the second TRP using the second cell group.

25. The UE of claim 20, wherein, to detect the RLF, the processor is further configured to:
 detect RLF associated with both the first cell group and the second cell group used by the first TRP and the second TRP, and
 initiate a radio resource control (RRC) connection re-establishment procedure between the UE and a network.

26. The UE of claim 12, wherein to detect the RLF, the processor is further configured to detect a listen-before-talk failure.

27. An apparatus for wireless communication, comprising:
 means for establishing a plurality of radio links between the apparatus and a plurality of transmission reception points (TRPs) including a first TRP and a second TRP, wherein the first TRP is part of a first cell group comprising the first TRP and one or more additional TRPs;
 means for determining a radio link monitoring (RLM) resource of a first radio link of the plurality of radio links, wherein the means for determining the RLM resource is configured to derive the RLM resource based on a ranked set of a plurality of control resource sets (CORESETs) associated with the first TRP and the second TRP;
 means for monitoring the first radio link according to the determined RLM resource;
 means for detecting a radio link failure (RLF) of the first radio link;
 means for determining that the first TRP is associated with the RLF of the first radio link based on the RLM resource of the first radio link; and
 means for transmitting an RLF notification indicating the RLF of the first radio link.

28. A non-transitory computer-readable storage medium having instructions stored thereon, that when executed by a user equipment (UE), cause the UE to perform operations for wireless communication, the operations comprising:
 establishing a plurality of radio links between the UE and a plurality of transmission reception points (TRPs) including a first transmission reception point (TRP) and a second TRP, wherein the first TRP is part of a first cell group comprising the first TRP and one or more additional TRPs;
 determining a radio link monitoring (RLM) resource of a first radio link of the plurality of radio links, wherein determining the RLM resource comprises deriving the RLM resource based on a ranked set of a plurality of control resource sets (CORESETs) associated with the first TRP and the second TRP;
 monitoring the first radio link according to the determined RLM resource;
 detecting a radio link failure (RLF) of the first radio link;
 determining that the first TRP is associated with the RLF of the first radio link based on the RLM resource of the first radio link; and transmitting an RLF notification indicating the RLF of the first radio link.

\* \* \* \* \*